US011908364B2

(12) United States Patent
Jang et al.

(10) Patent No.: US 11,908,364 B2
(45) Date of Patent: Feb. 20, 2024

(54) LOW-POWER DISPLAY DRIVING CIRCUIT PERFORMING INTERNAL ENCODING AND DECODING AND OPERATING METHOD THEREOF

(71) Applicant: SAMSUNG ELECTRONICS CO., LTD., Suwon-si (KR)

(72) Inventors: Byeongcheol Jang, Seoul (KR); Yonghoon Yu, Suwon-si (KR); Hongki Kwon, Seongnam-si (KR); Taewoo Kim, Hwaseong-si (KR); Jinyong Park, Suwon-si (KR); Hyunwook Lim, Seoul (KR); Woohyuk Jang, Hwaseong-si (KR); Hojun Chung, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 178 days.

(21) Appl. No.: 17/462,646

(22) Filed: Aug. 31, 2021

(65) Prior Publication Data

US 2022/0093026 A1 Mar. 24, 2022

(30) Foreign Application Priority Data

Sep. 23, 2020 (KR) ........................ 10-2020-0123322
May 12, 2021 (KR) ........................ 10-2021-0061644

(51) Int. Cl.
*H04N 19/00* (2014.01)
*G09G 3/20* (2006.01)
*G09G 5/00* (2006.01)

(52) U.S. Cl.
CPC ............... *G09G 3/20* (2013.01); *G09G 5/003* (2013.01); *G09G 2320/103* (2013.01);
(Continued)

(58) Field of Classification Search
CPC .... G06T 1/00; G06T 1/20; G06T 1/60; G06T 5/00; G06T 5/10; G06T 7/10; G06T 9/00;
(Continued)

(56) References Cited

U.S. PATENT DOCUMENTS 7,580,585 B2 8/2009 Malvar
9,307,244 B2 4/2016 Madanbashi et al.
(Continued)

FOREIGN PATENT DOCUMENTS

JP 3792881 B2 7/2006
JP 2006352335 A 12/2006

*Primary Examiner* — Chanh D Nguyen
*Assistant Examiner* — Nguyen H Truong
(74) *Attorney, Agent, or Firm* — Fish & Richardson P.C.

(57) ABSTRACT

Provided are a low-power display driving circuit performing internal encoding and decoding and an operating method thereof. The display driving circuit includes a memory configured to store an input bit stream encoded by an encoder and a controller configured to determine a data path through which output frame data in a second frame period passes according to whether internal encoding is successful in a first frame period, wherein, when the internal encoding is successful, the controller performs internal encoding in the second frame period, stores a generated internal bit stream in the memory, allows the internal bit stream to pass through a low-power path to generate the output frame data, and when the internal encoding fails, the controller generates the output frame data by allowing the input bit stream to pass through a normal path in the second frame period, changes an encoding setting of an internal encoder, and repeats the internal encoding.

20 Claims, 15 Drawing Sheets

(52) U.S. Cl.
CPC ... *G09G 2330/021* (2013.01); *G09G 2340/02* (2013.01); *G09G 2360/12* (2013.01); *G09G 2370/08* (2013.01)

(58) Field of Classification Search
CPC .. G09G 3/00; G09G 3/20; G09G 3/36; G09G 5/00; G09G 5/02; G09G 5/003; G09G 5/12; G09G 5/36; G09G 5/39; G09G 5/10; G09G 5/14; G09G 5/393; G09G 2320/103; G09G 2330/021; G09G 2340/02; G09G 2360/12; G09G 2370/08; H04N 5/77; H04N 5/235; H04N 5/783; H04N 5/232; H04N 5/265; H04N 5/57; H04N 5/926; H04N 9/64; H04N 7/14; H04N 7/50; H04N 21/234; H04N 21/236; H04N 19/105; H04N 19/14; H04N 19/46; H04N 19/159; H04N 19/176; H04N 19/136; H04N 19/154; H04N 19/85; H04N 19/124; H04N 19/172; H04N 19/65; H04N 19/117; H04N 19/50; H04N 19/577; H04N 19/423; H04N 19/543; H04N 19/182; H04N 19/60; H04N 19/44; H04N 19/129; H04N 19/426; H04N 19/166; H04N 17/00; H04N 17/02; G06F 3/06; G06F 3/14; G06F 3/147; G06F 3/0484; G06F 11/10; G06F 13/42; G06F 15/00; H04L 1/00; H04L 12/24; H04L 12/873; H04L 29/06
See application file for complete search history.

(56) References Cited

U.S. PATENT DOCUMENTS

| | | | | |
|---|---|---|---|---|
| 9,536,323 | B2 | 1/2017 | Okamoto | |
| 10,643,551 | B2 | 5/2020 | Park et al. | |
| 2011/0242112 | A1* | 10/2011 | Katayama | G09G 5/36 345/555 |
| 2015/0130824 | A1* | 5/2015 | Lee | G09G 3/20 345/534 |
| 2015/0163486 | A1* | 6/2015 | Li | H04N 19/14 375/240.25 |
| 2017/0263206 | A1* | 9/2017 | Bae | G09G 5/395 |
| 2022/0264069 | A1* | 8/2022 | Ha | G06T 1/20 |

* cited by examiner

LOW-POWER DISPLAY DRIVING CIRCUIT PERFORMING INTERNAL ENCODING AND DECODING AND OPERATING METHOD THEREOF

CROSS-REFERENCE TO RELATED APPLICATIONS

This application is based on and claims priority under 35 U.S.C. § 119 to Korean Patent Application Nos. 10-2020-0123322, filed on Sep. 23, 2020 and 10-2021-0061644, filed on May 12, 2021, in the Korean Intellectual Property Office, the subject matter of which are incorporated by reference.

BACKGROUND

The inventive concept relates to a display driving circuit, and more particularly, to a display driving circuit implemented with low power by performing internal encoding and decoding, and an operating method thereof.

Display devices include a display panel displaying an image and a display driving circuit driving the display panel. The display driving circuit may receive image data from the outside and perform a plurality of image processing steps.

At the same time, the display driving circuit may receive a still image and has to output an image signal at every set frame period even while the still image remains. In this instance, as image processing is repeatedly performed on the same image data at every frame period, power consumption may increase.

SUMMARY

The inventive concept provides a display driving circuit implemented with low power by repeatedly performing internal encoding, while changing an encoding setting, and an operating method thereof.

According to an aspect of the inventive concept, there is provided a display driving circuit outputting a still image, the display driving circuit including a memory configured to store an input bit stream encoded by a first encoder based on the still image and a controller configured to determine a data path through which output frame data in a second frame period passes according to whether internal encoding is successful in a first frame period, wherein, when the internal encoding is successful, the controller is configured to perform internal encoding in the second frame period, to store a generated internal bit stream in the memory, to allow the internal bit stream to pass through a low-power path to generate the output frame data, and when the internal encoding fails, the controller is configured to generate the output frame data by allowing the input bit stream to pass through a normal path in the second frame period, to change an encoding setting of an internal encoder, and to repeat the internal encoding.

According to another aspect of the inventive concept, there is provided a method of operating a display driving circuit outputting a still image, the method including generating a plurality of segments of frame data based on an input bit stream in a first frame period, determining at least one of the segments of frame data as data to be encoded, and performing internal encoding on the data to be encoded, changing at least one of the data to be encoded or an encoding setting when the internal encoding fails, and repeating the internal encoding in a second frame period.

According to another aspect of the inventive concept, there is provided a display driving circuit including a memory configured to store an input bit stream, a first decoder configured to decode the input bit stream to generate first frame data, a plurality of image processors configured to perform image processing on the first frame data to generate a plurality of processing data, an internal encoder configured to perform internal encoding on at least one of the segments of processed data, an internal decoder configured to decode the internal bit stream stored in the memory and output the decoded bit stream when the internal encoding is successful, and a controller configured to change an encoding setting of the internal encoder and to control the internal encoder to repeat the internal encoding, when the internal encoding fails.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the inventive concept will be described in detail with reference to the accompanying drawings.

Figure 1:
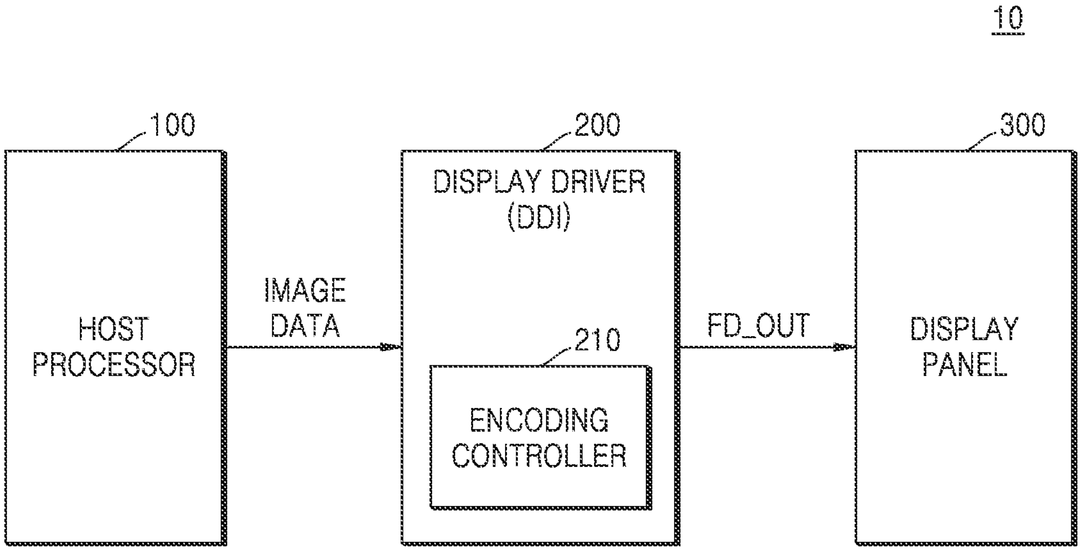
FIG. 1 is a block diagram illustrating an electronic device according to an example embodiment of the inventive concept.

FIG. 1 is a block diagram illustrating an electronic device 10 according to an example embodiment of the inventive concept.

Referring to FIG. 1, the electronic device 10 may include a host processor 100, a display driving circuit (or a display driver (DDI)) 200, and a display panel 300.

According to various embodiments, the electronic device 10 may include devices having an image display function. For example, the electronic device 10 may include a smartphone, a tablet personal computer (PC), a portable multimedia player (PMP), a camera, a wearable device, an internet of things (IoT), a tv set, a digital video disk (DVD) player, a refrigerator, an air conditioner, an air purifier, a set-top box (STB), a robot, a drone, various medical devices, a navigation device, a global positioning system (GPS) receiver, an advanced drivers assistance system (ADAS), a vehicle device, furniture, or various measuring instruments.

The host processor 100 may control the electronic device 10 as a whole. The host processor 100 may generate image data IMAGE DATA to be displayed on the display panel 300, and transmit the image data IMAGE DATA to the display driving circuit 200. As an embodiment, the host processor 100 may encode the image data IMAGE DATA and transmit an encoded image result as an input bit stream to the display driving circuit 200.

The host processor 100 may display a moving image (or a video) on the display panel 300, and a portion of the moving image may be in a stationary state for a certain time. In this case, the host processor 100 may transmit the image data IMAGE DATA in the stationary state to the display driving circuit 200, and may not transmit the image data IMAGE DATA to the display driving circuit 200 for a certain period of time thereafter. The display driving circuit 200 may output the received image data IMAGE DATA to the display panel 300 for a certain period of time.

Thereafter, when the stationary state of the moving image is terminated, the host processor 100 may transmit new image data IMAGE DATA to the display driving circuit 200.

In some embodiments, the host processor 100 may correspond to an application processor. However, the inventive concept is not limited thereto, and the host processor 100 may be implemented as various types of processors such as a central processing unit (CPU), a microprocessor (microprocessor), a multimedia processor, and a graphics processing unit. For example, the host processor 100 may be implemented as an integrated circuit (IC) or may be implemented as a mobile application processor (AP) or a system on chip (SoC).

The display driving circuit 200 may receive the image data IMAGE DATA from the host processor 100, convert the image data IMAGE DATA into frame data FD_OUT and transmit the frame data result to the display panel 300 to drive the display panel 300.

In some embodiments, to periodically output a still image for a certain period of time, the display driving circuit 200 may store the image data IMAGE DATA received from the host processor 100 and periodically output the stored image data IMAGE DATA to the display panel 300.

To output the image data IMAGE DATA, the display driving circuit 200 may encode a processed data result, on which a number of image processes are completed, store an encoded data result, and periodically decode the stored data and output a decoded data result, instead of repeatedly performing the image processing operations. Accordingly, while the still image remains, the image processing operations may be bypassed to reduce power consumption by the display driving circuit 200.

According to an embodiment of the inventive concept, the display driving circuit 200 may include an encoding controller 210. Whether the encoding of the processed data result is successful may be determined according to an encoding environment or setting, and when the encoding of the processed data result fails, the encoding controller 210 may repeat the encoding again, while changing the encoding setting, to increase an encoding success probability.

In some embodiments, the encoding controller 210 may change the processed data to be encoded. For example, as a high image complexity of the processed data increases, a probability that the encoding will fail increases. Therefore, the encoding controller 210 may determine processed data having a low image complexity as data to be encoded. This embodiment will be described later with reference to FIGS. 3 to 8B.

In some embodiments, the encoding controller 210 may change a bit depth of processed data to be encoded. This embodiment will be described later with reference to FIGS. 9 to 13.

In some embodiments, the encoding controller 210 may change a period for storing the bit stream generated as a result of encoding in the memory. This embodiment will be described later with reference to FIGS. 14 and 15.

The display panel 300, a display unit on which an actual image is displayed, may include display devices displaying a two-dimensional (2D) image upon receiving electrically transmitted image signals IS, such as a thin film transistor-liquid crystal display (TFT-LCD), an organic light emitting diode (OLED) display, a field emission display, and a plasma display panel (PDP). The display panel 300 may be implemented as another type of flat panel display or a flexible display panel.

Figure 2:
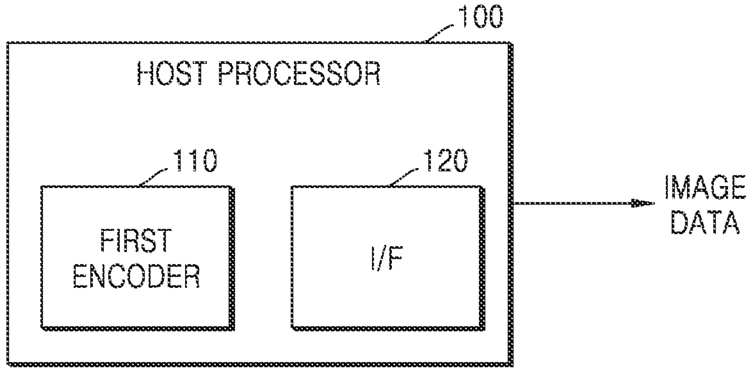
FIG. 2 is a block diagram illustrating a host processor according to an example embodiment of the inventive concept.

FIG. 2 is a block diagram illustrating a host processor according to an example embodiment of the inventive concept.

Referring to FIG. 2, the host processor 100 may include a first encoder 110 and an interface circuit (I/F) 120.

The first encoder 110 may perform encoding on the image data IMAGE DATA. According to an embodiment, the first encoder 110 may generate an input bit stream by performing encoding on the image data IMAGE DATA corresponding to the still image. The first encoder 110 may perform encoding on the first frame of the still image and may not perform encoding of the image data IMAGE DATA in a subsequent frame period. Hereinafter, the image data IMAGE DATA generated by the first encoder 110 is referred to as an input bit stream (e.g., BS_IN of FIG. 3). The first encoder 110 may be implemented as a display stream compression (DSC) encoder, but is not limited thereto.

The I/F 120 may transmit the encoded image data result IMAGE DATA to the display driving circuit 200 through a channel. In an example embodiment, the I/F 120 may support an RGB interface, a CPU interface, a serial interface, a mobile display digital interface (MDDI), an inter integrated circuit (I2C) interface, a serial peripheral interface (SPI), a micro controller unit (MCU) interface, a mobile industry processor interface (MIN), an embedded display port (eDP) interface, a D-subminiature (D-sub), an optical interface, a high definition multimedia interface (HDMI), etc. Further, in an example embodiment, I/F 120 may also support a mobile high-definition link (MHL) interface, a secure digital (SD) card/multi-media card (MMC) interface, or an Infrared Data Association (IrDA) standard interface.

Figure 3:
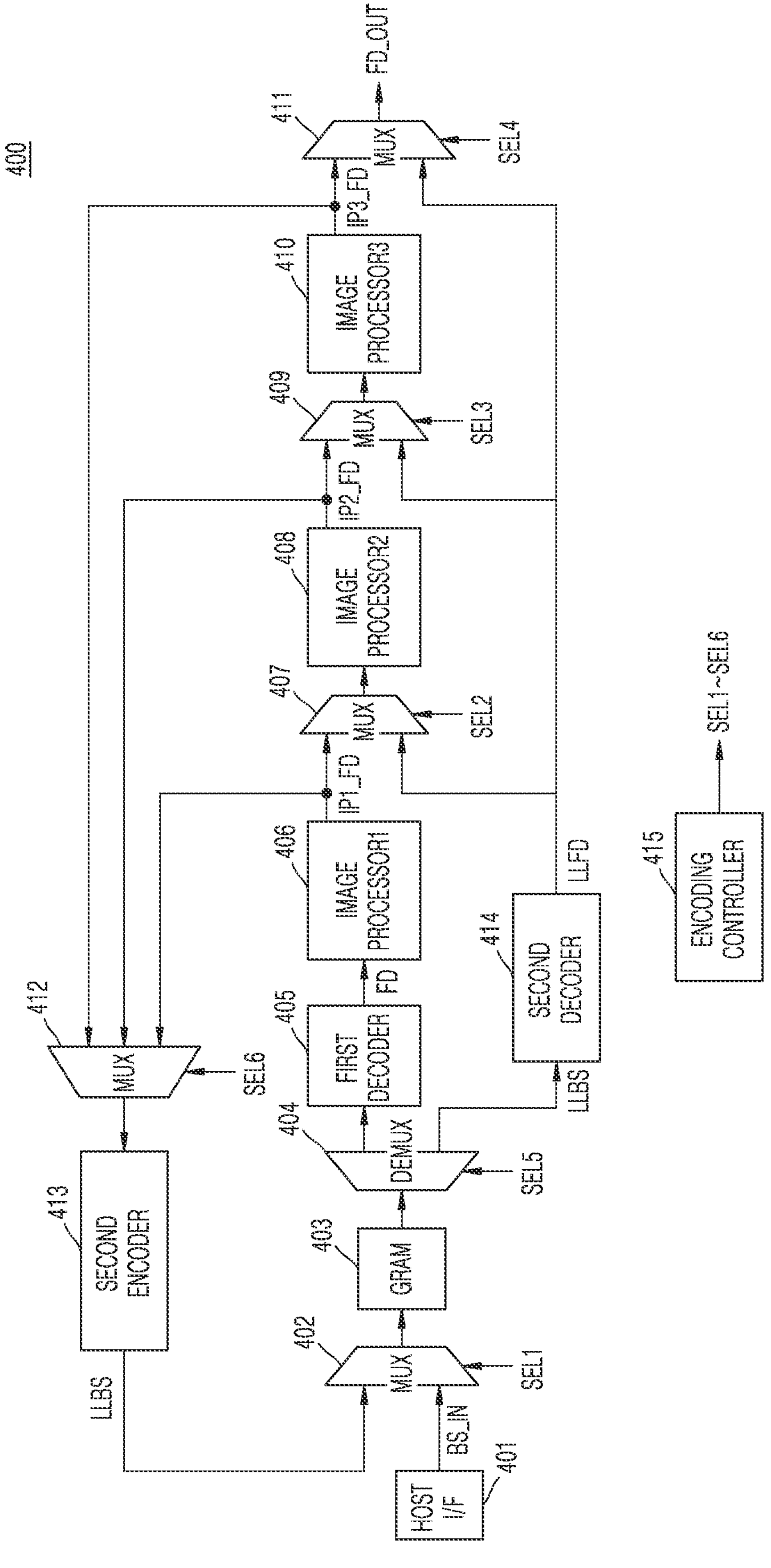
FIG. 3 is a block diagram illustrating a display driving circuit according to an example embodiment of the inventive concept.

FIG. 3 is a block diagram illustrating a display driving circuit 400 according to an example embodiment of the inventive concept.

Referring to FIG. 3, the display driving circuit 400 may include a host I/F 401, a graphic memory (GRAM) 403, a first decoder 405, a plurality of image processors 406, 408, and 410 (including first to third image processors 406, 408, and 410), a second encoder 413, a second decoder 414, first to fifth multiplexers (MUXs) 402, 407, 409, 411, and 412, a first demultiplexer (DEMUX) 404, and an encoding controller 415. In addition, the display driving circuit 400 may further include a source driver generating a driving signal based on the output frame data FD_OUT and transmit the generated driving signal to the display panel 300.

The host I/F 401 may receive the input bit stream BS_IN from the host processor 100 and transmit the received bit stream BS_IN to other components of the display driving circuit 400 including the encoding controller 415. The host I/F 401 may correspond to the I/F 120 of FIG. 2.

The GRAM 403 may store the input bit stream BS_IN compressed by the first encoder 110 of the host processor 100. In addition, the GRAM 403 may store at least one of the processed data result generated by the image processors 406, 408, and 410, and store the bit stream compressed by the second encoder 413. The GRAM 403 may output stored data under the control of the encoding controller 415.

The GRAM 403 include a volatile memory such as dynamic random access memory (DRAM), static random access memory (SRAM) or a non-volatile memory such as ROM or flash memory, resistive random access memory (ReRAM), and magnetic random access memory (MRAM).

The first decoder 405 may decode the input bit stream BS_IN encoded by the first encoder 110 of the host processor 100. A decoding method of the first decoder 405 may correspond to the encoding method of the first encoder 110, and thus, only data encoded by the first encoder 110 may be decoded.

The image processors 406, 408, and 410 may perform various image processes necessary to display the input bit stream BS_IN received from the host processor 100 on the display panel 300, and may include commands therefor.

For example, the image processors 406, 408, and 410 may include a vertex shader module, a geometric shader module, a pixel shader module, a rasterizer module, a blending module, a tessellation module, an interpolation module, a dithering module, and a sub-pixel rendering module.

At least one of the image processors 406, 408, and 410 may be powered off according to an operation mode and/or data path of the display driving circuit 400. As an example, when the display driving circuit 400 operates in a low power mode, the image processors excluding the dithering module and the sub-pixel rendering module may be powered off.

The second encoder 413 may encode data IP1_FD, IP2_FD, and IP3_FD generated by the components inside the display driving circuit 400. For example, the second encoder 413 may encode frame data FD generated by the first decoder 405 and processed data result output from each of the image processors 406, 408, and 410.

In some embodiments, the second encoder 413 may encode data in a lossless manner, and thus, the second encoder 413 may be referred to as a lossless encoder. Hereinafter, the second encoder 413 is referred to as a lossless encoder, and a bit stream generated by the second encoder 413 is referred to as a lossless bit stream LLBS, but is not limited thereto. As an embodiment, because the second encoder 413 is located inside the display driving circuit 400, the second encoder 413 may also be referred to as an internal encoder.

The second decoder 414 may correspond to the second encoder 413 and decode data encoded by the second encoder 413. In some embodiments, because the second decoder 414 may decode the bit stream BS_IN in a lossless manner, the second decoder 414 may be referred to as a lossless decoder, and frame data generated as a result of lossless decoding may be referred to as a lossless frame data LLFD. The LLFD may be the same as before the LLBS is encoded. In some embodiments, because the second decoder 414 is located inside the display driving circuit 400, the second decoder 414 may also be referred to as an internal decoder.

According to an embodiment of the inventive concept, because the still image remains for a certain period of time, the input bit stream BS_IN may not be received from the host I/F 401 for a certain period of time. Accordingly, when the input bit stream BS_IN constituting a first frame of the still image is received, the encoding controller 415 may store the received input bit stream BS_IN, and during a frame period in which the bit stream BS_IN is not received from the outside, the encoding controller 415 may periodically output the input bit stream BS_IN from the GRAM 403 to generate output frame data FD_OUT. Accordingly, the display panel 300 may output a still image to the screen at predetermined intervals.

The encoding controller 415 may determine a data path through which the input bit stream BS_IN passes to generate the output frame data FD_OUT from the input bit stream BS_IN stored in the GRAM 403.

The encoding controller 415 may control the operation of the components of the display driving circuit 400 according to the data path, and may generate control signals SEL1 to SEL6 for determining output of the first to fifth multiplexers MUXs 402, 407, 409, 411, and 412 and the first demultiplexerDEMUX 404, for example.

The encoding controller 415 may generate the output frame data FD_OUT by allowing the input bit stream BS_IN received from the host processor 100 to pass through a normal path or allowing the LLBS generated through the second encoder 413 to pass through the low-power path. The normal path refers to a path in which the input bit stream BS_IN is output through all image processors of the display driving circuit 400, and the low-power path refers to a path in which the stored bit stream is output through only some components. The normal path and the low-power path will be described later with reference to FIGS. 4A and 4B.

While generating the output frame data FD_OUT periodically, the encoding controller 415 may generate the LLBS and the lossless frame data LLFD to perform the low-power path. That is, the second encoder 413 and the second decoder 414 may be operated. As an embodiment, lossless encoding may be performed on any one of frame data output from the first decoder 405 and a plurality of segments of processed data output from the image processors 406, 408, and 410, respectively. Such lossless encoding may be performed in parallel with the operation of generating the output frame data.

According to an embodiment of the inventive concept, because the processed data generated after certain image processing is completed is internally compressed and stored, and the stored data (i.e., the LLBS) is decoded and output, there is no need to repeatedly perform certain image processes at every period in which a frame is to be output.

That is, only the second decoder 414 decoding the stored data and the image processors through which the processed data has not passed yet, may need to be powered on, and the other components, (e.g., the first decoder 405 and the image processors) through which the processed data has already passed, may be powered off.

Meanwhile, because lossless encoding is a variable bitrate (VBR) method, a size of an output LLBS is not uniform. If the size of the LLBS is irregular, the LLBS may not be stored in the GRAM 403 in some cases and it may be difficult to implement a low-power path.

Thus, according to an embodiment of the inventive concept, data to be encoded may be changed or an encoding setting may be changed to make lossless encoding successful. In an embodiment, lossless encoding may be repeatedly performed, while changing the processed data input to the second encoder 413 and the encoding settings. Accordingly, a low-power path may be implemented in various situations such as characteristics of still images and uncertainty of the lossless encoding method.

Figure 4A:
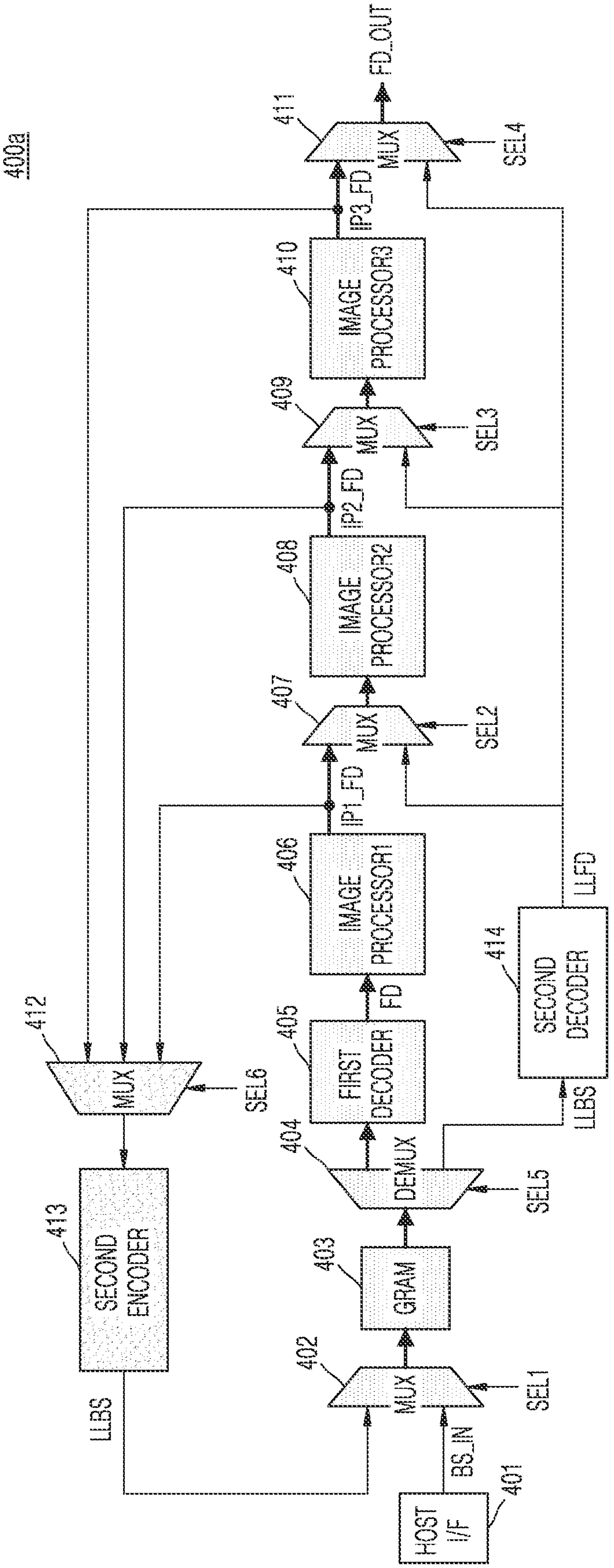
FIGS. 4A and 4B are diagrams illustrating data paths according to an example embodiment of the inventive concept.
Figure 4B:
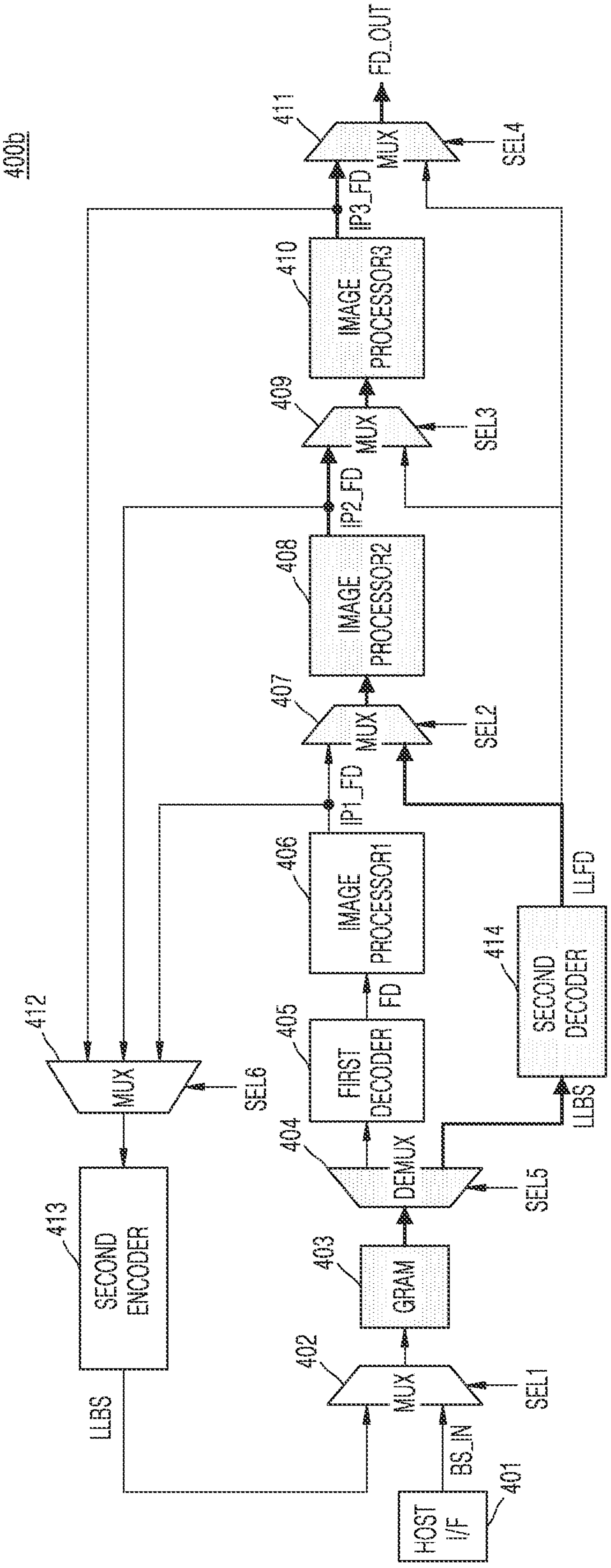

FIGS. 4A and 4B are diagrams illustrating data paths according to an example embodiment of the inventive concept.

Hereinafter, it is assumed that the input bit stream BS_IN corresponding to a first frame of the still image is received from the host processor 100 and storing the input bit stream BS_IN in the GRAM 403 is completed. FIG. 4A illustrates a normal path 400*a* in a first frame period and lossless encoding performed in parallel with the normal path 400*a*, and FIG. 4B illustrates a low-power path 400*b* in a second frame period when lossless encoding is successful.

Referring to FIG. 4A, the input bit stream BS_IN stored in the GRAM 403 may be provided to the first decoder 405 through the first DEMUX 404. The first decoder 405 may perform decoding corresponding to the encoding method of the first encoder 110 to generate the frame data FD.

Various image processes may be applied to the frame data FD, while the frame data FD passes through the first to third image processors 406, 408, and 410. Data output from each image processor is referred to as processed data. In the normal path 400*a*, the third processed data IP3_FD passing through the first to third image processors 406, 408, and 410 may be determined as the output frame data FD_OUT and may be provided to the source driver.

In parallel with the implementation of the normal path 400*a*, first to third processed data IP1_FD, IP2_FD, and IP3_FD output from the first to third image processors 406, 408, and 410, respectively, may be provided to the second encoder 413 through the fifth MUX 412. The second encoder 413 may perform lossless encoding on any one of the first to third processed data IP1_FD, IP2_FD, and IP3_FD under the control of the encoding controller 415.

When lossless encoding of the second encoder 413 is successful, the generated LLBS may be stored in the GRAM 403 through the first MUX 402.

When lossless encoding of the second encoder 413 fails, lossless encoding may be repeated in a next frame period. As an embodiment, the second decoder 414 may perform lossless encoding on the third processed data IP3_FD in the first frame period, and if the lossless encoding fails, the second decoder 414 may perform lossless encoding on the second processed data IP2_FD in the second frame period.

Referring to FIG. 4B, the second encoder 413 may perform lossless encoding on the first processed data IP1_FD and store a resultantly generated LLBS in the GRAM 403.

Thereafter, the LLBS stored in the GRAM 403 may be provided to the second decoder 414 through the first DEMUX 404. The second decoder 414 may perform decoding corresponding to the encoding method of the second encoder 413 to generate lossless frame data LLFD. In any event, in terms of the characteristics of the lossless encoding method, the lossless frame data LLFD is the same as the first processed data IP1_FD, and thus, the lossless frame data LLFD may be output to the source driver through the second and third image processors 408 and 410.

Thus, power of the first decoder 405 and power of the first image processor 406 may be turned off, because the first processed data IP1_FD has already passed through the of the first decoder 405 and the first image processor 406.

Therefore, the electronic device 10 including the display driving circuit 400 may operate in a low power mode. For example, the low power mode may be an Always on Display (AoD) mode in which a preset image is displayed on the screen.

The normal path 400*a* in the AoD mode may include only essential image processors among the image processors 406, 408, and 410, and in this case, non-essential image processors may be in a power-off state. As an example, essential image processors may include a sub-pixel rendering module and a dithering module. As the non-essential image processors do not operate, image quality of the AoD image may deteriorate.

According to an embodiment of the inventive concept, the non-essential image processors may be operated and lossless encoding may be performed even in the normal path of the AoD mode. As lossless encoding is successful, not only non-essential image processors but also essential image processors may be powered off, thereby reducing power consumption and improving output image quality.

Figure 5:
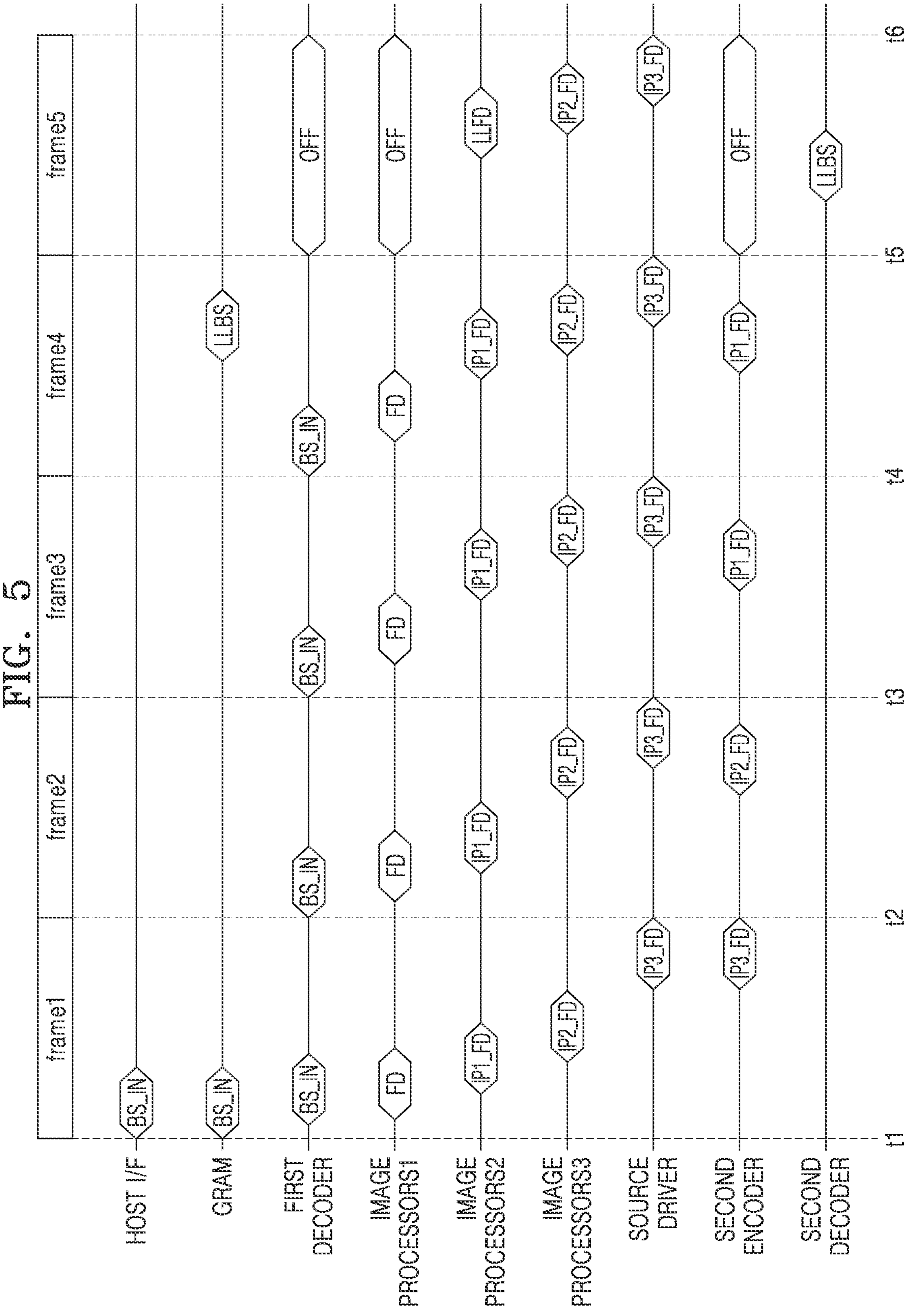
FIG. 5 is a timing diagram of a display driving circuit according to an example embodiment of the inventive concept.

FIG. 5 is a timing diagram of a display driving circuit according to an example embodiment of the inventive concept. Data input to each component is illustrated, and output data is omitted. Meanwhile, the timing at which data is input to each component is not limited to this timing diagram. Each of t1 to t6 may refer to a time at which a vertical synchronization signal Vsync is logic high. As the normal path 400*a* or the low-power path 400*b* is performed five times in a first frame period t1 to t2 to a fifth frame period t5 to t6, the output frame data FD_OUT may be generated five times. As the still image is output in t1 to t6, the host I/F 401 may receive the input bit stream BS_IN corresponding to the first frame of the still image only once.

Referring to FIGS. 3 and 5 together, in the first frame period t1 to t2, the host I/F 401 may receive the input bit stream BS_IN and store the received input bit stream BS_IN in the GRAM 403. The received input bit stream BS_IN may correspond to the first frame of the still image.

Through the normal path 400*a*, the first decoder 405 may decode the input bit stream BS_IN to generate the frame data FD, the first image processor 406 may perform image processing to generate the first processed data IP1_FD, the second image processor 408 may perform image processing to generate the second processed data IP2_FD, and the third image processor 410 may perform image processing to generate third processed data IP3_FD. Thereafter, the third processed data IP3_FD may be provided to the source driver.

Here, the second encoder 413 may receive the third processed data IP3_FD and perform lossless encoding thereon. In some instances, lossless encoding may fail because image complexity of the third processed data IP3_FD is high, or data generated as a result of lossless encoding may not be stored in the GRAM 403 because its size is large.

In a second frame period t2 to t3, the input bit stream BS_IN stored in the GRAM 403 may be output. As in the first frame period t1 to t2, through the normal path 400*a*, the first decoder 405 may generate the frame data FD, the first image processor 406 may generate the first processed data IP1_FD, the second image processor 408 may generate the second processed data IP2_FD, the third image processor 410 may generate the third process data IP3_FD, and the third process data IP3_FD may be provided to the source driver.

Here, the second encoder 413 may receive the second processed data IP2_FD and perform lossless encoding thereon. For example, lossless encoding of the second processed data IP2_FD may fail, and lossless encoding may be repeated as the encoding setting is changed in a next frame period.

In a third frame period t3 to t4, the input bit stream BS_IN stored in the GRAM 403 in the first frame period t1 to t2 may be output. The input bit stream BS_IN may pass through the normal path 400*a*, and the third processed data IP3_FD may be provided to the source driver.

Here, the second encoder 413 may receive the first processed data IP1_FD and perform lossless encoding thereon. Because an image complexity of the first processed data IP1_FD may be lower than that of the second and third processed data IP2_FD and IP3_FD, lossless encoding may be successful.

In a fourth frame period t4 to t5, lossless encoding may be performed with the same settings as that of the lossless encoding performed in the third frame period t3 to t4 based on information on the successful lossless encoding in the third frame period t3 to t4. That is, the second encoder 413 may encode the first processed data IP1_FD, and the resultantly generated LLBS may be stored in the GRAM 403. In this instance, the LLBS may be directly stored in the GRAM 403 in the third frame period t3 to t4 according to the performance of the GRAM 403.

The source driver may receive the third processed data IP3_FD generated as the input bit stream BS_IN passes through the normal path 400*a*.

In a fifth frame period t5 to t6, the low-power path 400*b* for the LLBS may be performed instead of the normal path 400*a* for the input bit stream BS_IN. Accordingly, the first decoder 405, the first image processor 406, and the second encoder 413 may be powered off.

Through the low-power path 400*b*, the second decoder 414 may decode the LLBS to generate the lossless frame data LLFD. Because the LLBS is generated based on the first processed data IP1_FD, the lossless frame data LLFD may be the same as the first processed data IP1_FD. Accordingly, the second image processor 408 may receive the lossless frame data LLFD and perform image processing to generate the second processed data IP2_FD, and the third image processor 410 may perform image processing to generate third processed data IP3_FD. Thereafter, the third processed data IP3_FD may be provided to the source driver.

Thereafter, while the still image remains, the low-power path 400*b* may be entered, and the third processed data IP3_FD may be provided to the source driver. Meanwhile, when the still image is terminated, the host I/F 401 may receive a new input bit stream BS_IN, and accordingly, the low-power path 400*b* may be terminated and the normal path may be entered again.

Figure 6:
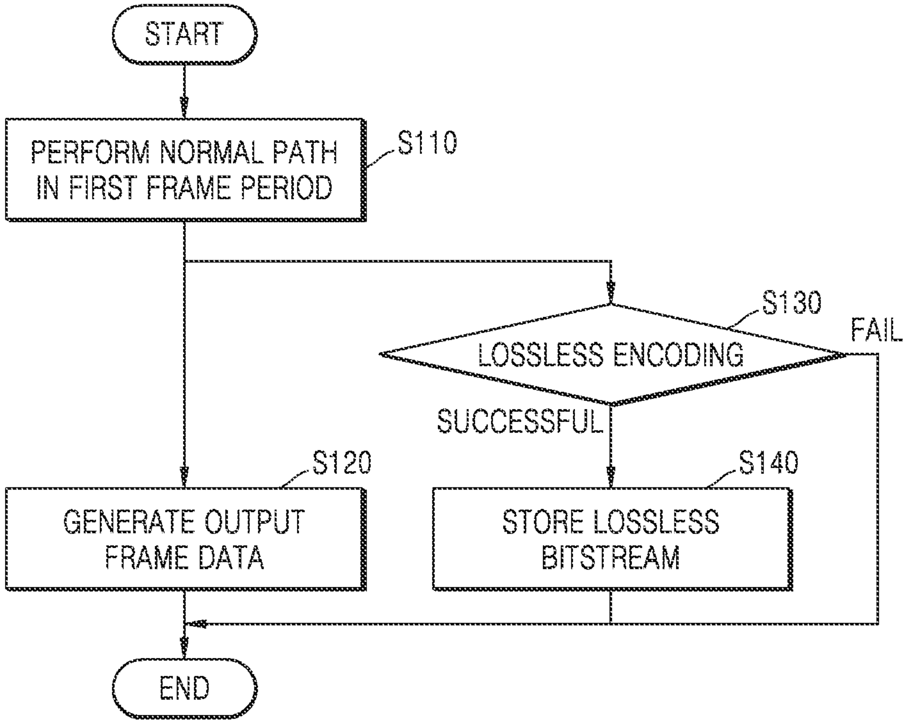
FIGS. 6 and 7 are flowcharts illustrating a method of operating a display driving circuit, according to an example embodiment of the inventive concept.
Figure 7:
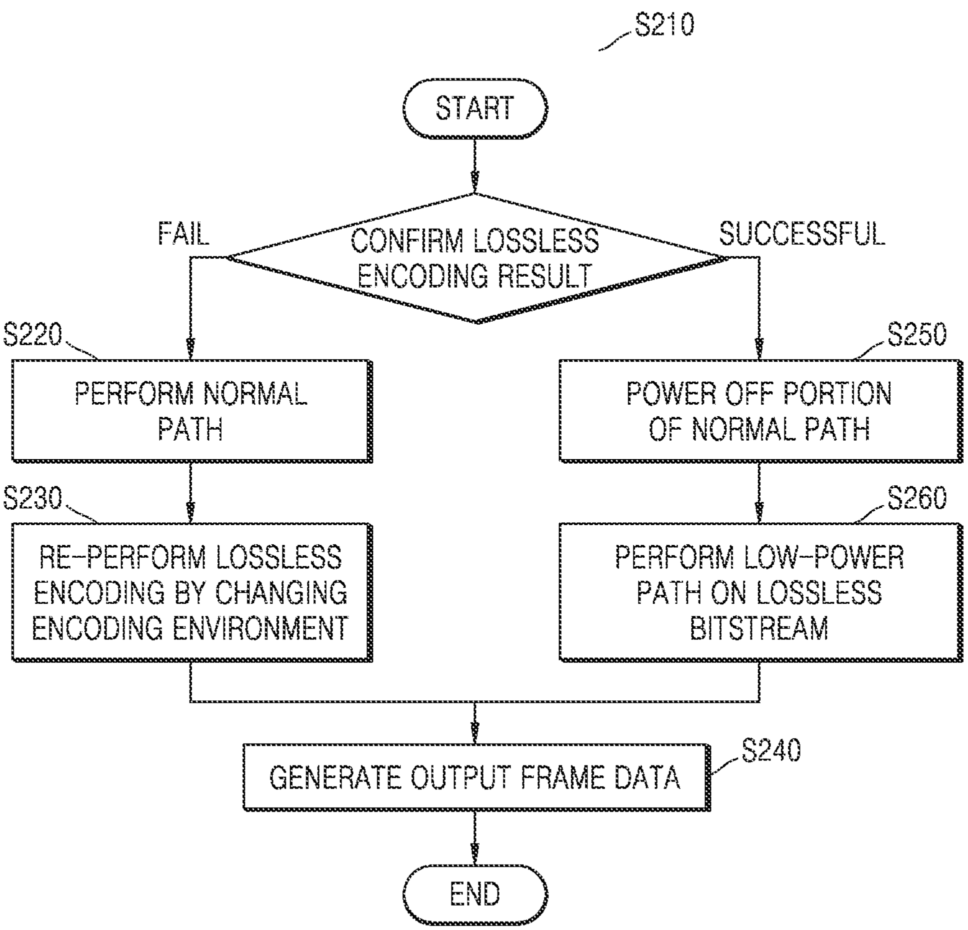

FIGS. 6 and 7 are flowcharts illustrating a method of operating a display driving circuit, according to an example embodiment of the inventive concept. FIG. 6 illustrates an operation in the first frame period, and FIG. 7 illustrates an operation in the second frame period.

Referring to FIGS. 3 and 6 together, the normal path may be performed in the first frame period (S110), and the output frame data FD_OUT may be generated (S120). As an embodiment, the normal path may include the first decoder 405 and the plurality of image processors 406, 408, and 410, and the output frame data FD_OUT may be the third processed data IP3_FD.

In parallel with the normal path being entered, lossless encoding may be performed on at least one of the frame data generated in the normal path and the plurality of segments of processed data (S130).

When lossless encoding is successful, the generated LLBS may be stored in the GRAM 403 (S140), and when lossless encoding fails, the first frame period may be terminated. At the same time, for an operation speed and stability of the GRAM 403, the LLBS may be stored in the GRAM 403 in a frame period subsequent to the first frame period.

Referring to FIGS. 3 and 7 together, a result of lossless encoding performed in the first frame period is confirmed (S210), and accordingly, a path for generating the output frame data FD_OUT in the second frame period may be determined. The second frame period is not limited to refer to a frame period immediately following the first frame period, and may refer to, for example, a frame period after the LLBS is stored in the GRAM 403.

When lossless encoding fails and only the input bit stream BS_IN is stored in the GRAM 403, the normal path may be entered by the input bit stream BS_IN (S220). In parallel with the normal path, lossless encoding may be repeated as the encoding environment or setting is changed (S230). As a result of the normal path, the output frame data FD_OUT may be generated and output (S240).

As an embodiment of altering the encoding settings, as described above with reference to FIGS. 3 to 5, processed data to be subjected to lossless encoding may be altered. In addition, a plurality of embodiments for changing the encoding settings will be described later.

When lossless encoding is successful and the LLBS is stored in the GRAM 403, the components through which the LLBS has passed before having been encoded may be powered off (S250).

As the LLBS passes through the low-power path 400*b* (S260), the output frame data FD_OUT may be generated (S240). The low-power path 400*b* may include components, for example, the second decoder 414 and the image processors 406, 408, and 410, excluding the powered-off components, and output frame data FD_OUT may be the third processed data IP3_FD.

Figure 8A:
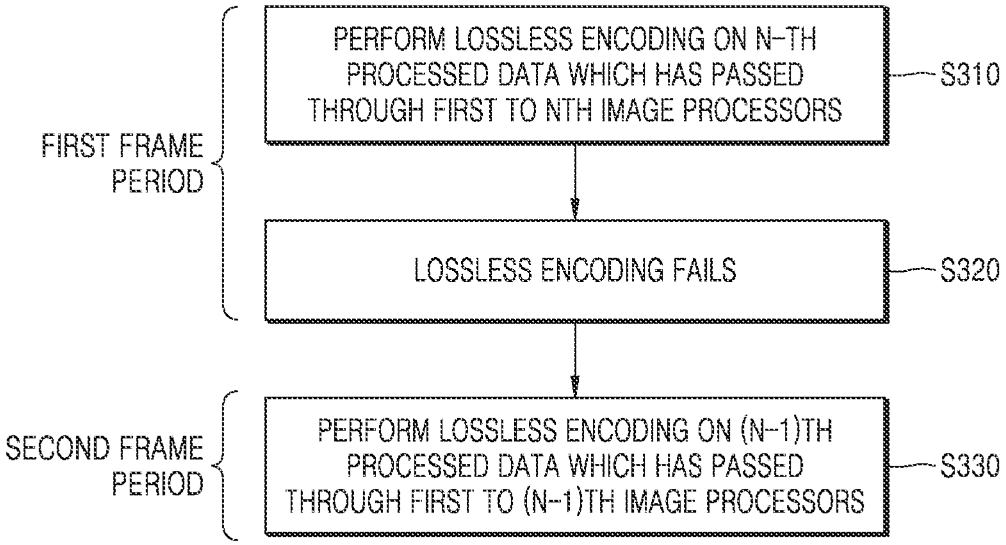
FIGS. 8A and 8B are flowcharts illustrating a method of repeating lossless encoding of a display driving circuit, according to an example embodiment of the inventive concept.
Figure 8B:
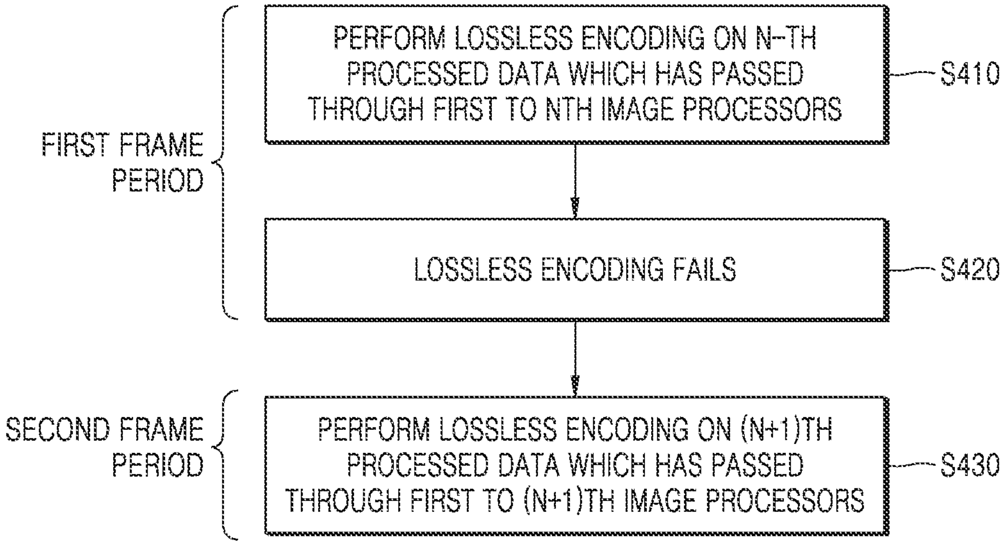

FIGS. 8A and 8B are flowcharts illustrating a method of repeating lossless encoding by a display driving circuit, according to an example embodiment of the inventive concept. As described above with reference to FIGS. 3 to 5, the encoding settings may be altered and lossless encoding may be repeated. Hereinafter, it is assumed that the display driving circuit 400 includes n+1 image processors.

Referring to FIG. 8A, lossless encoding may be performed on nth processed data generated through first to n-th image processors in the first frame period (S310). If lossless encoding fails (S320), lossless encoding may be repeated on the (n−1)-th processed data generated through the first to (n−1)-th image processors in the second frame period, which is a subsequent frame period (S330).

Referring to FIG. 8B, lossless encoding may be performed on the n-th processed data generated through the first to n-th image processors in the first frame period (S410). If lossless encoding fails (S420), lossless encoding may be repeated on (n+1)th processed data generated through the first to (n+1)-th image processors in the second frame period, which is a subsequent frame period (S430). At this time, the first to n-th image processors may be connected to a front end of the (n+1)-th image processor. That is, operations of the first to n-th image processors may be performed before an operation of the (n+1)-th image processor.

The order of altering the data to be encoded is not limited thereto, and for example, lossless encoding may be performed on the processed data determined according to a predetermined order.

Figure 9:
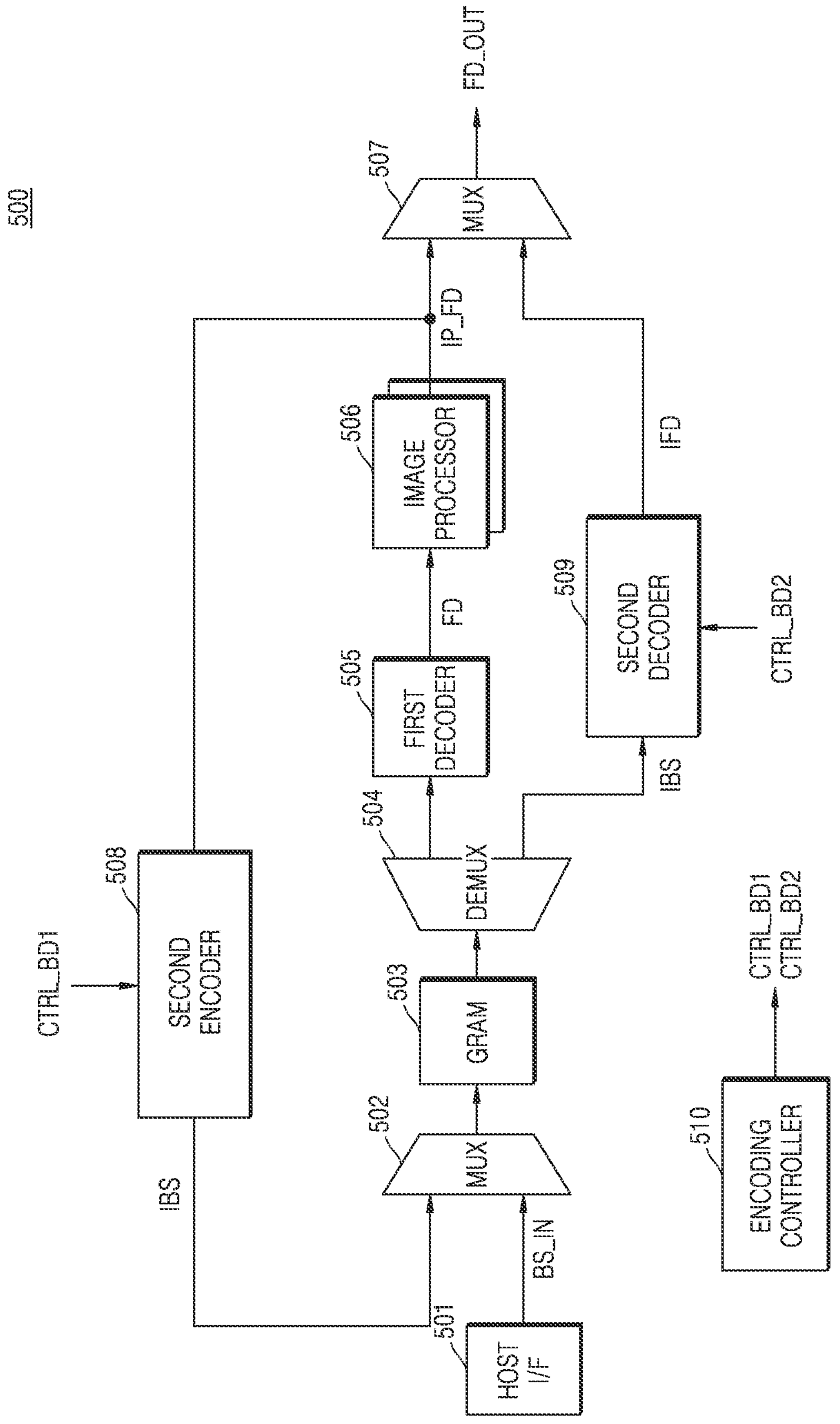
FIG. 9 is a block diagram illustrating a display driving circuit according to an example embodiment of the inventive concept.
Figure 10:
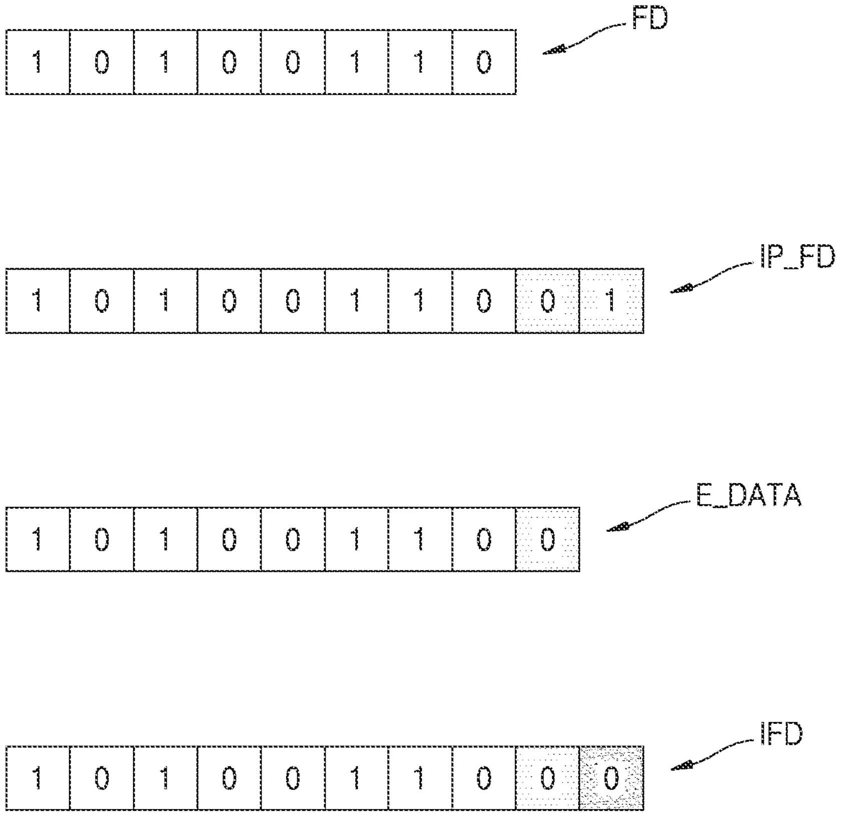
FIG. 10 is a conceptual diagram illustrating a method of operating a display driving circuit, according to an example embodiment of the inventive concept.

FIG. 9 is a block diagram illustrating a display driving circuit 500 according to an example embodiment of the inventive concept, and FIG. 10 is a conceptual diagram illustrating a method of operating a display driving circuit, according to an example embodiment of the inventive concept. Because the display driving circuit 500 is similar to the display driving circuit 400 of FIG. 3, a redundant description thereof will be omitted.

Referring to FIG. 9, an encoding controller 510 may change a bit depth of processed data to be encoded (i.e., to-be-encoded data E_DATA) to change an encoding setting by providing a first control signal CTRL_BD1 and/or a second control signal CTRL_BD2. Also, a bit depth of a bit stream to be decoded (i.e., to-be-decoded data D_DATA) may be altered to correspond thereto. That is, unlike FIG. 3, a second encoder 508 and a second decoder 509 may perform internal encoding and internal decoding in a manner different from the lossless method. Therefore, data input to the second encoder 508 and data output from the second decoder 509 may not be exactly the same, and thus, hereinafter, an output from the second encoder 508 is referred to as an internal bit stream (IBS) and an output from the second decoder 509 is referred to as internal frame data IFD.

Referring to FIG. 10, image data generated by the host processor 100 may be an RGB image, and FIG. 10 may indicate a bit depth of any one of the RGB channels. The frame data FD may be generated from the input bit stream BS_IN through the normal path, and a bit depth of the frame data FD may be 8 bits. The bit depth may increase as the frame data FD undergoes a plurality of image processes. For example, a bit depth of the processed data IP_FD, which has passed through the plurality of image processors, may be 10 bits.

If the bit depth of the to-be-encoded data E_DATA is large, the probability of internal encoding failure may increase. Therefore, the encoding controller 510 may increase the probability of internal encoding success by decreasing the bit depth of the processed data IP_FD. The encoding controller 510 may change the number of bits to be reduced by providing a first control signal CTRL_BD1 to the second encoder 508.

Hereinafter, a case in which internal encoding is successful by reducing the bit depth of the processed data IP_FD by one bit will be described as an example. That is, an IBS having a bit depth of 9 bits may be generated. The encoding controller 510 may restore the reduced bit depth by providing a second control signal CTRL_BD2 to the second decoder 509.

The second decoder 509 may generate the to-be-decoded data D_DATA by decoding the IBS and may generate internal frame data IFD by restoring one bit to the decoded data D_DATA.

At the same time, the method of reducing the bit depth of the processed data IP_FD, performed by the encoding controller 510, and the method of restoring the bit depth of the IBS are not limited to either one. As an embodiment, the encoding controller 510 may generate the to-be-encoded data E_DATA by deleting the least significant bit of the processed data IP_FD or a bit at a preset position. Although as illustrated and shown by the drawings, that one bit is deleted, the number of bits to be deleted is not limited thereto.

As an embodiment, the encoding controller 510 may generate the internal frame data IFD by restoring the bit in the deleted position or a predetermined position. For example, when the least significant bit of the processed data IP_FD is deleted and the to-be-encoded data E_DATA having a bit depth of 9 bits is generated, the encoding controller 510 may generate internal frame data IFD having a bit depth of 10 bits by adding 1 bit to the least significant bit of the to-be-decoded data D_DATA. Various restoration methods, for example, '0' padding, '1' padding, extended dithering, etc. may be used.

At the same time, the bit depth of the frame data FD may be the same as the bit depth of the input bit stream BS_IN. That is, the bit depth may not increase even after undergoing the image processes, and in this case, the encoding controller 510 may omit the operation of reducing the bit depth and the operation of restoring the bit depth.

According to an embodiment of the inventive concept, the encoding controller 510 may increase the encoding success probability by reducing the bit depth of the to-be-encoded data E_DATA, and may reduce corruption of data by restoring the bit depth and performing decoding.

Figure 11:
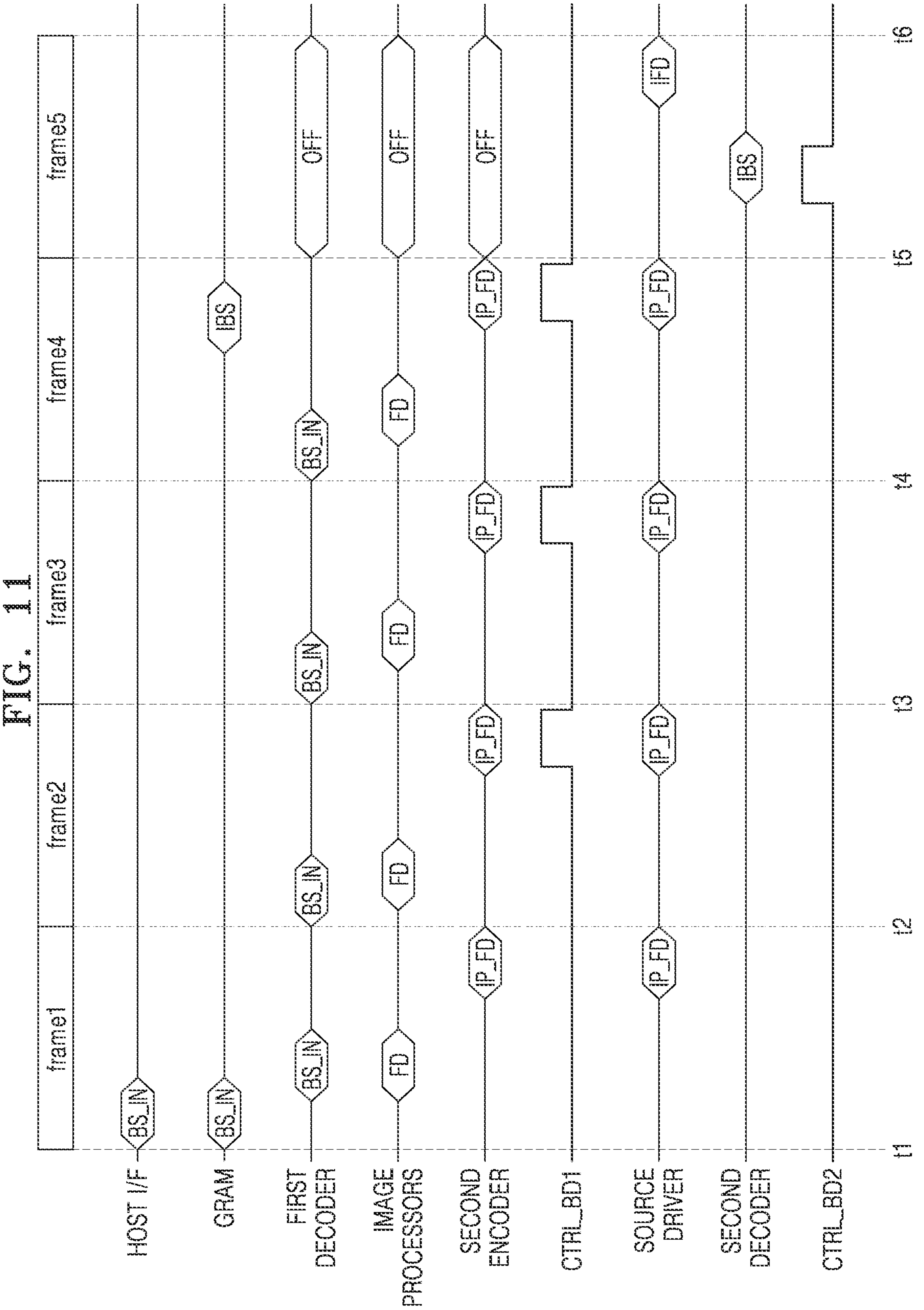
FIG. 11 is a timing diagram of a display driving circuit according to an example embodiment of the inventive concept.

FIG. 11 is a timing diagram of a display driving circuit according to an example embodiment of the inventive concept. The timing diagram of FIG. 11 may be similar to the timing diagram of FIG. 5, in which a normal path is performed in the first frame period t1 to t2 to the fourth frame period t4 to t5 and the low-power path may be performed in the fifth frame period t5 to t6.

Referring to FIGS. 9, 10, and 11 together, in the first frame period t1 to t2, a host I/F 501 may receive the input bit stream BS_IN and store the received bit stream BS_IN in a GRAM 503. The received input bit stream BS_IN may correspond to the first frame of the still image.

The first decoder 505 may decode the input bit stream BS_IN through the normal path to generate frame data FD, a plurality of image processors 506 may perform image processing to generate processed data IP_FD, and the processed data IP_FD may be provided to the source driver. A second encoder 508 may receive the processed data IP_FD and perform internal encoding thereon, and internal encoding may fail.

In the second frame period t2 to t3, the input bit stream BS_IN stored in the GRAM 503 may be output. As in the first frame period, through the normal path, the first decoder 505 may generate frame data FD, and the image processors 506 may generate the processed data IP_FD and provide the generated processed data IP_FD to the source driver.

An encoding controller 510 may transmit a first control signal CTRL_BD1 to the second encoder 508 to thereby generate the to-be-encoded data E_DATA in which the bit depth of the processed data IP_FD is reduced by 1. The number of bits to be reduced is not limited thereto. The second encoder 508 may perform internal encoding on the to-be-encoded data E_DATA based on the first control signal CTRL_BD1, and the internal encoding may fail.

In the third frame period t3 to t4, the normal path may be entered. Here, the encoding controller 510 may transmit the first control signal CTRL_BD1 to the second encoder 508 to thereby generate the to-be-encoded data E_DATA in which the bit depth of the processed data IP_FD is reduced by 2. The number of bits to be reduced is not limited thereto, and may be reduced by the number of bits different from the second frame period t2 to t3. The second encoder 508 may perform internal encoding based on the first control signal CTRL_BD1, and the internal encoding may be successful.

In the fourth frame period t4 to t5, internal encoding may be performed in the same setting as the internal encoding performed in the third frame period t3 to t4. That is, the second encoder 508 may generate the IBS by performing internal encoding based on the first control signal CTRL_BD1. The IBS may be stored in the GRAM 503. At the same time, the IBS may be directly stored in the GRAM 503 in the third frame period t3 to t4. The input bit stream BS_IN passes through the normal path, and resultantly generated processed data IP_FD may be transmitted to the source driver.

In the fifth frame period t5 to t6, the first decoder 505, the image processors 506, and the second encoder 508 may be powered off, and the low-power path may be entered by the IBS stored in the GRAM 503.

The encoding controller 510 may restore the reduced bit depth of the IBS by transmitting the second control signal CTRL_BD2 to the second decoder 509. For example, the second decoder 509 may generate the to-be-decoded data D_DATA by decoding the IBS and generate the internal frame data IFD by restoring or adding 2 bits to the to-be-decoded data D_DATA. The second decoder 509 may provide the internal frame data IFD to the source driver.

Thereafter, while the still image remains, the low-power path may be entered and the internal frame data IFD may be provided to the source driver. At the same time, when the still image is terminated, the host I/F 501 may receive a new input bit stream BS_IN, and accordingly, the low-power path may be terminated and the normal path may be re-entered.

Figure 12:
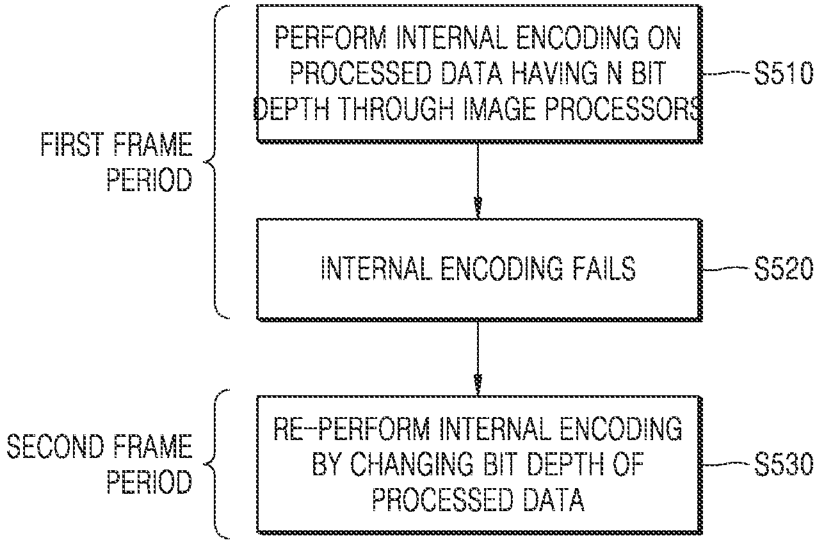
FIG. 12 is a flowchart illustrating a method of repeating internal encoding of a display driving circuit according to an example embodiment of the inventive concept.

FIG. 12 is a flowchart illustrating a method of repeating internal encoding of the display driving circuit according to an example embodiment of the inventive concept. As described above with reference to FIGS. 9 to 11, the bit depth of the to-be-encoded data E_DATA may be changed and internal encoding may be repeated. This may correspond to an embodiment in which the encoding environment or settings described in operation S230 of FIG. 7 is changed.

Referring to FIG. 12, internal encoding may be performed on the processed data IP_FD having a bit depth of N, generated as a result of passing through the image processors 506 in the first frame period (S510). If internal encoding fails (S520), the bit depth of the processed data IP_FD may be changed in the second frame period, which is a next frame period, so that internal encoding may be repeated (S530). For example, the bit depth may be reduced by 1 bit.

Figure 13:
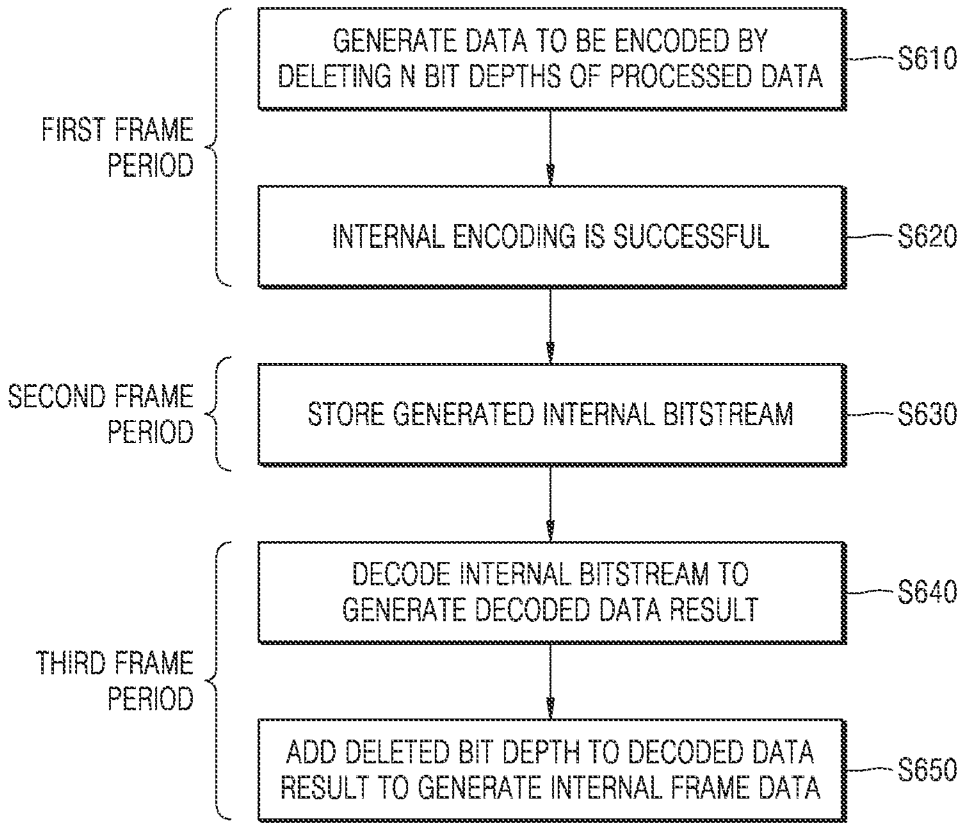
FIG. 13 is a flowchart illustrating a method of operating a display driving circuit, according to an example embodiment of the inventive concept.

FIG. 13 is a flowchart illustrating a method of operating a display driving circuit, according to an example embodiment of the inventive concept.

Referring to FIG. 13, the to-be-encoded data E_DATA may be generated by deleting the bit depth of the processed data IP_FD by N bits in the first frame period (S610). As a result, if internal encoding is successful (S620), the IBS may be stored in the GRAM 503 in the second frame period (S630). For an operation speed and stability of the GRAM 403, a frame period in which internal encoding is performed may be different from a frame period in which the IBS is stored.

In the third frame period, the IBS may be decoded to generate a decoded data result D_DATA (S640). The bit depth corresponding to the bits deleted in the decoded data result D_DATA may be restored to generate the internal frame data IFD (S650). For example, N bits may be added. The low-power path may be performed as the internal frame data IFD is output to the source driver. Meanwhile, the number of bits to be added is not limited thereto, and a number of bits different from the number of deleted bits may be added.

Figure 14:
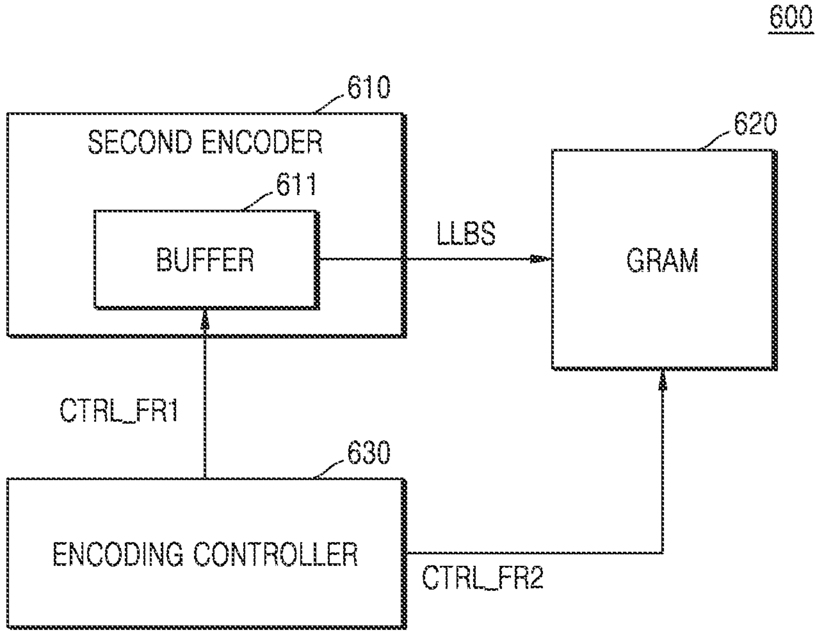
FIG. 14 is a block diagram illustrating a portion of a display driving circuit according to an example embodiment of the inventive concept.

FIG. 14 is a block diagram illustrating a portion of a display driving circuit 600 according to an example embodiment of the inventive concept.

Referring to FIG. 14, the display driving circuit 600 may include a second encoder 610 including a buffer 611, a GRAM 620, and an encoding controller 630. The respective components are similar to those described above, and thus, repeated descriptions thereof are omitted. The buffer 611 may temporarily store a LLBS generated through lossless encoding. As an embodiment, the buffer 611 may be an asynchronous buffer or a first- in first-out (FIFO).

In terms of characteristics of the lossless encoding method, the size of the LLBS and an output period of the LLBS may be irregular. Accordingly, in a predetermined frame period, the operation of the second encoder 610 may be stopped as the buffer 611 is full. In addition, due to a limitation of a bandwidth of the GRAM 620, the LLBS stored in the buffer 611 may not be stored in the GRAM 620 even if the buffer 611 is not full.

Therefore, according to an embodiment of the inventive concept, a success rate of lossless encoding may be increased by altering an encoding setting by changing an output frequency of the buffer 611 and an operating frequency of the GRAM 620. As an embodiment, as lossless encoding by the second encoder 610 fails, the encoding controller 630 may generate a first control signal CTRL_FR1 controlling the operating frequency of the buffer 611 and a second control signal CTRL_FR2 controlling the operating frequency of the GRAM 620 and provide the generated first control signal CTRL_FR1 and the generated second control signal CTRL_FR2 to the buffer 611 and the GRAM 620. Accordingly, the buffer 611 may be prevented from being full despite the irregularities of the lossless encoder.

A period for inputting the encoded LLBS may be different from a period for outputting the encoded LLBS, and an operating frequency of the components of the display driving circuit may be different from an operating frequency of the GRAM 620. At the same time, although the buffer 611 is illustrated as being inside the second encoder 610 in FIG. 14, a position of the buffer 611 is not limited thereto.

Figure 15:
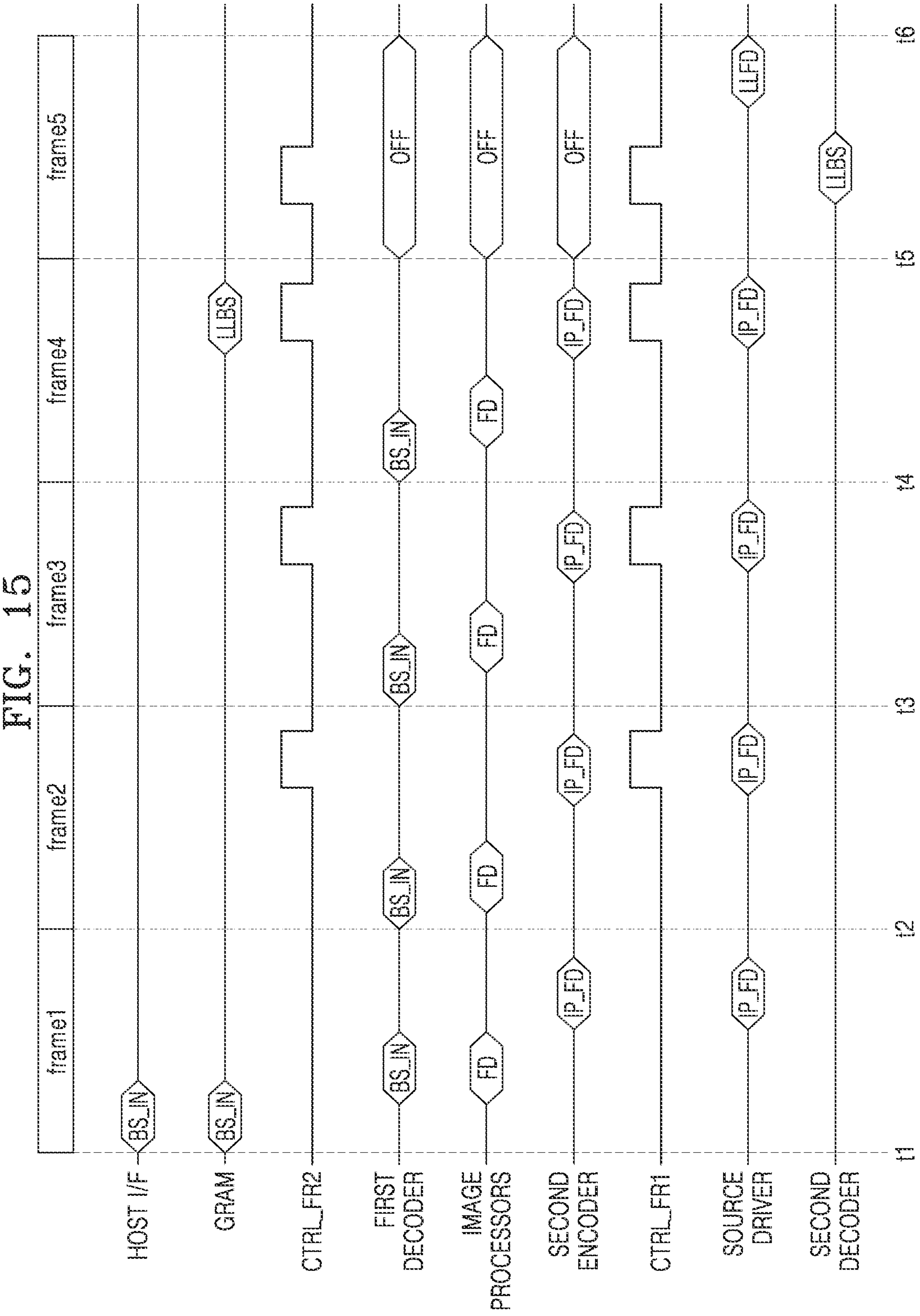
FIG. 15 is a timing diagram of a display driving circuit according to an example embodiment of the inventive concept.

FIG. 15 is a timing diagram of a display driving circuit according to an example embodiment of the inventive concept. The timing diagram of FIG. 15 may be similar to the timing diagram of FIGS. 5 and 12, in which the normal path may be entered in the first frame period t1 to t2 to the fourth frame period t4 to t5 and the low-power path may be entered in the fifth frame period t5 to t6.

Referring to FIGS. 14 and 15 together, in the first frame period t1 to t2, the host I/F 501 may receive the input bit stream BS_IN and store the received input bit stream BS_IN in the GRAM 620. The received input bit stream BS_IN may correspond to the first frame of the still image.

Through the normal path, the first decoder 505 may decode the input bit stream BS_IN to generate the frame data FD, the image processors 506 may perform image processing to generate the processed data IP_FD, and the processed data IP_FD may be provided to the source driver. The second encoder 610 may receive the processed data IP_FD and perform lossless encoding.

The operating frequency of the GRAM 620 may be a first frequency, for example, 100 MHz. In this case, the buffer 611 may be full due to the low operating frequency, and thus, the LLBS may not be stored.

In the second frame period t2 to t3, the input bit stream BS_IN stored in the GRAM 620 may be output. As in the first frame period, through the normal path, the first decoder 505 may generate the frame data FD and the image processors 506 may generate the processed data IP_FD and provide the generated processed data IP_FD to the source driver.

The encoding controller 630 may transmit the first control signal CTRL_FR1 to the buffer 611 and transmit the second control signal CTRL_FR2 to the GRAM 620 to thereby set each operating frequency to a second frequency. The second frequency may be, for example, 110 MHz. Although the operating frequency has increased, the lossless encoding may fail as the buffer 611 is full.

In the third frame period t3 to t4, the normal path may be entered. The encoding controller 630 may set operating frequencies of the buffer 611 and the GRAM 620 to a third frequency through the first control signal CTRL_FR1 and the second control signal CTRL_FR2. The third frequency may be, for example, 150 MHz. Because the bandwidth of the GRAM 620 is increased, the generated LLBS may be sufficiently stored in the GRAM 620. The LLBS may be stored in the GRAM 620 directly in the corresponding frame period, or the LLBS may be stored in a next frame period for stability of operation.

In the fourth frame period t4 to t5, lossless encoding may be performed with the same settings as the lossless encoding performed in the third frame period t3 to t4. That is, the operating frequencies of the buffer 611 and the GRAM 620 may be set to the third frequency through each of the first control signal CTRL_FR1 and the second control signal CTRL_FR2. Lossless encoding may be successful, and the LLBS generated as a result of lossless encoding may be stored in the GRAM 620. In addition, the normal path may be performed to generate the processed data IP_FD, and the processed data IP_FD may be provided to the source driver.

Thereafter, in the fifth frame period t5 to t6, the first decoder 505, the image processors 506, and the second encoder 610 may be powered off and the low-power path may be entered by the IBS stored in the GRAM 620.

Although each embodiment has been individually described with reference to FIGS. 1 to 15, two or more embodiments may be combined. As an embodiment, the encoding controller (e.g., 415 of FIG. 3) may change the bit depth of the to-be-encoded data in the first to third frame periods, and if internal encoding fails as a result, the to-be-encoded data in the fourth frame period may be altered to other processed data in the fourth frame period. Also, as an embodiment, the encoding controller (e.g., 630 of FIG. 1) may perform internal encoding, by altering the to-be-encoded data, in the first to third frame periods, and the operating frequencies of the buffer 611 and the GRAM 620 may be changed in the fourth frame period. In addition, as internal encoding is successful by merging the respective embodiments, an image with improved image quality may be output even in the low power mode.

While the inventive concept has been particularly shown and described with reference to embodiments thereof, it will be understood that various changes in form and details may be made therein without departing from the spirit and scope of the following claims.

What is claimed is:

1. A display driving circuit for outputting a still image, the display driving circuit comprising:

a memory configured to store an input bit stream encoded by a first encoder based on said still image;

a normal data path including a first decoder;

a low-power data path including a second decoder;

a controller configured to selected one of the normal data path and the low-power data path through which output frame data in a second frame period passes according to whether internal encoding is successful in a first frame period, wherein, when the internal encoding is successful, the controller is configured to perform internal encoding in the second frame period, to store a generated internal bit stream in the memory, to allow the internal bit stream to pass through the low-power data path to generate the output frame data, and when the internal encoding fails, the controller is configured to generate the output frame data by allowing the input bit stream to pass through the normal data path in the second frame period, to change an encoding setting of an internal encoder, and to repeat the internal encoding.

2. The display driving circuit of claim 1, wherein the normal data path includes:

the first decoder which is configured to decode the input bit stream to generate frame data; and a plurality of image processors configured to perform image processing on the frame data to generate a plurality of segments of processed data, and the controller is configured to perform the internal encoding on at least one of the segments of the processed data and the frame data.

3. The display driving circuit of claim 2, wherein, as the internal encoding on a first processed data, which have passed through first to third of said plurality of image processors, in the first frame period fails, the controller is configured to repeat the internal encoding on a second processed data which have passed through the first and second of said plurality of image processors in the second frame period.

4. The display driving circuit of claim 2, wherein, as the internal encoding on a first processed data, which have passed through first to third of said plurality of image processors, in the first frame period fails, the controller is configured to repeat the internal encoding on a second processed data which have passed through the first to fourth of said plurality of image processors in the second frame period.

5. The display driving circuit of claim 2, wherein, as the internal encoding on first processed data in the first frame period fails, the controller is configured to generate data to be encoded by altering a bit depth of the first processed data and to repeat the internal encoding on the data to be encoded in the second frame period.

6. The display driving circuit of claim 5, wherein the controller is configured to generate the data to be encoded by reducing the bit depth of the first processed data.

7. The display driving circuit of claim 6, wherein the controller is configured to store a first internal bit stream generated as a result of repeating the internal encoding in the second frame period in the memory, and to perform internal decoding on the first internal bit stream and to restore the bit depth of the first internal data.

8. The display driving circuit of claim 1, wherein, as the internal encoding of processed data generated through the normal data path in the first frame period is successful, the controller is configured to turn off power to the normal data path in the second frame period.

9. The display driving circuit of claim 1, wherein the low-power path further includes:

the decoder which is configured to decode the internal bit stream to generate frame data; and a plurality of first image processors configured to perform image processing on the frame data.

10. The display driving circuit of claim 9, wherein the internal bit stream is generated based on processed data which have passed through second image processors, to the exclusion of said first image processors.

11. The display driving circuit of claim 10, wherein an operation of the second image processors is performed before an operation of the first image processors.

12. The display driving circuit of claim 10, wherein the controller is configured to turn off power of the second image processors in the second frame period.

13. The display driving circuit of claim 1, further comprising:

an asynchronous buffer configured to temporarily store the internal bit stream, wherein, in the second frame period, if the internal encoding fails, the controller is configured to change an output frequency of the asynchronous buffer.

14. The display driving circuit of claim 1, wherein a number of image processors in the normal data path is greater than a number of image processors in the low-power data path.

15. A method of operating a display driving circuit outputting a still image, the method comprising:

generating a plurality of segments of frame data based on an input bit stream in a first frame period;

determining at least one of the segments of frame data as data to be encoded, and performing internal encoding on the data to be encoded;

altering at least one of the data to be encoded and an encoding setting when the internal encoding fails; and repeating the internal encoding in a second frame period, wherein the altering includes changing a bit depth of the data to be encoded.

16. The method of claim 15, wherein, in the repeating of said internal encoding, first frame data generated through first and second image processors is designated as said data to be encoded, and in the altering, the data to be encoded is changed into second frame data generated through first to third image processors.

17. The method of claim 15, wherein, in the repeating of internal encoding, first frame data generated through first to third image processors is designated as said data to be encoded, and in the altering, the data to be encoded is changed into second frame data generated through first and second image processors.

18. The method of claim 15, further comprising:

storing an internal bit stream generated by repeating the internal encoding in the second frame period; and restoring a bit depth of the internal bit stream in a third frame period.

19. The method of claim 15, wherein the display driving circuit operates in a low-power mode, and the method further comprises:

storing an internal bit stream generated by repeating the internal encoding in the second frame period in a memory; and turning off a decoder and at least one image processor through which the internal bit stream has passed.

20. A display driving circuit comprising:

a memory configured to store an input bit stream;

a first decoder configured to decode the input bit stream to generate first frame data;

a plurality of image processors configured to perform image processing on the first frame data to generate a plurality of segments of processed data;

an internal encoder configured to perform internal encoding on at least one of the segments of processed data;

an internal decoder configured to decode the internal bit stream stored in the memory and output the decoded bit stream when the internal encoding is successful; and a controller configured to change an encoding setting of the internal encoder and to control the internal encoder to repeat the internal encoding, when the internal encoding fails, wherein the changing the encoding setting of the internal encoder includes changing a bit depth of the processed data to be encoded.

* * * * *